United States Patent [19]

Borkowski

[11] 4,250,978
[45] Feb. 17, 1981

[54] LINING WEAR SENSOR

[75] Inventor: Donald F. Borkowski, South Bend, Ind.

[73] Assignee: The Bendix Corporation, Southfield, Mich.

[21] Appl. No.: 54,364

[22] Filed: Jul. 2, 1979

[51] Int. Cl.³ ............................................. F16D 66/02
[52] U.S. Cl. .................................. 188/1 A; 116/208; 192/30 W
[58] Field of Search .................... 188/1 A; 192/30 W; 116/208

[56] References Cited

U.S. PATENT DOCUMENTS

| 3,141,524 | 7/1964 | Mishler | 116/208 X |
|---|---|---|---|
| 3,190,397 | 6/1965 | Sudres | |
| 3,456,236 | 7/1969 | Labartino et al. | |
| 3,972,391 | 8/1976 | Penn | 188/1 A |
| 4,005,766 | 2/1977 | Kennel | 188/1A |
| 4,085,827 | 4/1978 | Kestermeier | 188/1 A |

FOREIGN PATENT DOCUMENTS

| 2444921 | 8/1976 | Fed. Rep. of Germany | 188/1 A |
|---|---|---|---|
| 44-19048 | 8/1969 | Japan. | |

Primary Examiner—George E. A. Halvosa
Attorney, Agent, or Firm—Paul David Schoenle; Ken C. Decker

[57] ABSTRACT

A brake lining wear sensor produces an audible signal when it engages a rotating brake drum upon a predetermined amount of lining wear. The sensor is disposed within a groove between a friction lining and a brake shoe rim. Portions of the sensor project away from a body portion and engage the rotating brake drum to produce the warning signal. The projecting portions also cooperate with surfaces of the brake shoe rim or the friction lining to retain the sensor within the groove.

3 Claims, 4 Drawing Figures

LINING WEAR SENSOR

BACKGROUND OF THE INVENTION

This invention relates to a brake lining wear sensor which produces an audible warning signal when a brake friction lining wears to a predetermined thickness.

State and Federal regulations may soon require vehicles to include warning devices to warn a vehicle operator of a worn brake friction lining condition. Previous audible lining wear sensors have utilized electronic circuitry to produce an audible signal. Other sensors have required complicated sensor or brake pad structure or attaching methods to retain the sensor in the required position in the brake assembly. Therefore, it is desirable for a lining wear sensor to have a simple structure. It is also desirable that such a sensor be adapted for use in existing standard production brake components.

SUMMARY OF THE INVENTION

It is an object of this invention to provide a brake lining wear sensor which produces an audible high frequency alarm signal.

It is an object of this invention to provide a lining wear sensor adapted for use with standard production brake shoe parts.

It is an object of this invention to provide a lining wear sensor with parts which perform both a signal generating function and a sensor retaining function.

The lining wear sensor disclosed herein consists of a flat strip of spring steel with flexible ends turned up a given length to engage the brake drum when the friction lining wears to a predetermined thickness. The sensor is trapped in a groove in the friction lining between the friction lining and the brake shoe rim and the turned-up ends engage the friction lining edges to hold the sensor within the groove. In an alternate embodiment the sensor end portions cooperate with bores in the friction lining and in the brake shoe rim to hold the sensor within the groove.

DETAILED DESCRIPTION

Figure 1:
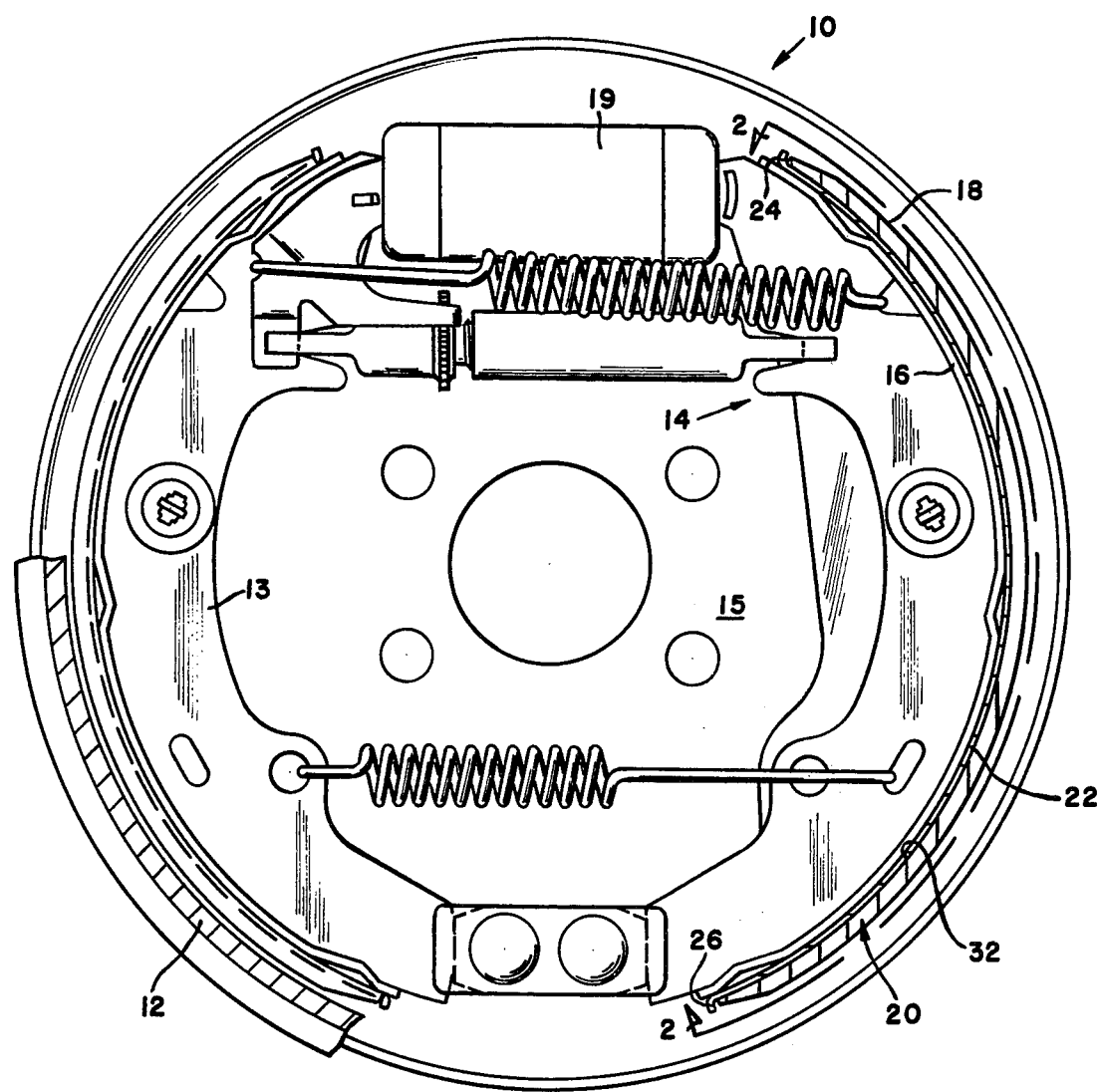
FIG. 1 is a view of a brake with the lining wear sensor described below disposed between the brake shoe rim and the friction lining.

A brake drum 12 and a pair of brake shoes 13, 14 are mounted on backing plate 15. The brake shoe 14 includes a rim 16 which carries a friction lining 18. A hydraulic actuator 19 urges the friction lining 18 into frictional engagement with the brake drum 12 in a braking application.

The lining 18 includes a groove 32 of a given depth and width cut or formed on the inner surface of the friction lining and may extend for the entire length of the friction lining. The lining 18 is bonded or riveted to the brake shoe rim 16.

Figure 2:
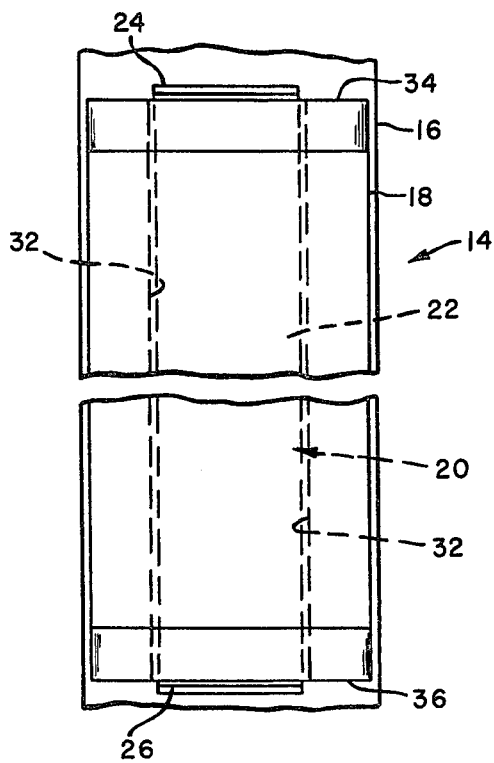
FIG. 2 is a view of a brake shoe used in the brake illustrated in FIG. 1 taken along line 2—2 of FIG. 1.

A brake lining wear sensor 20 illustrated in FIGS. 1 and 2 includes a flat strip-like body portion 22 and a plurality of projecting portions 24 and 26 located at the ends of the sensor body 22. The projection portions extend substantially perpendicularly away from the brake shoe rim 16. The sensor body portion 22 is trapped between the rim 16 and the friction lining 18 within the groove 32. The sensor 20 extends beyond the ends 34 and 36 of friction lining 18 so that the friction lining 18 lies between the projecting portions 24 and 26.

Figure 4:
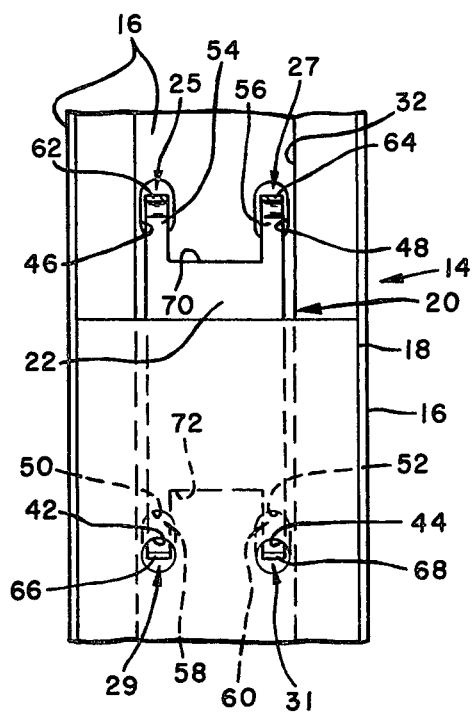
FIG. 4 is a view along line 4—4 of FIG. 3.
Figure 3:
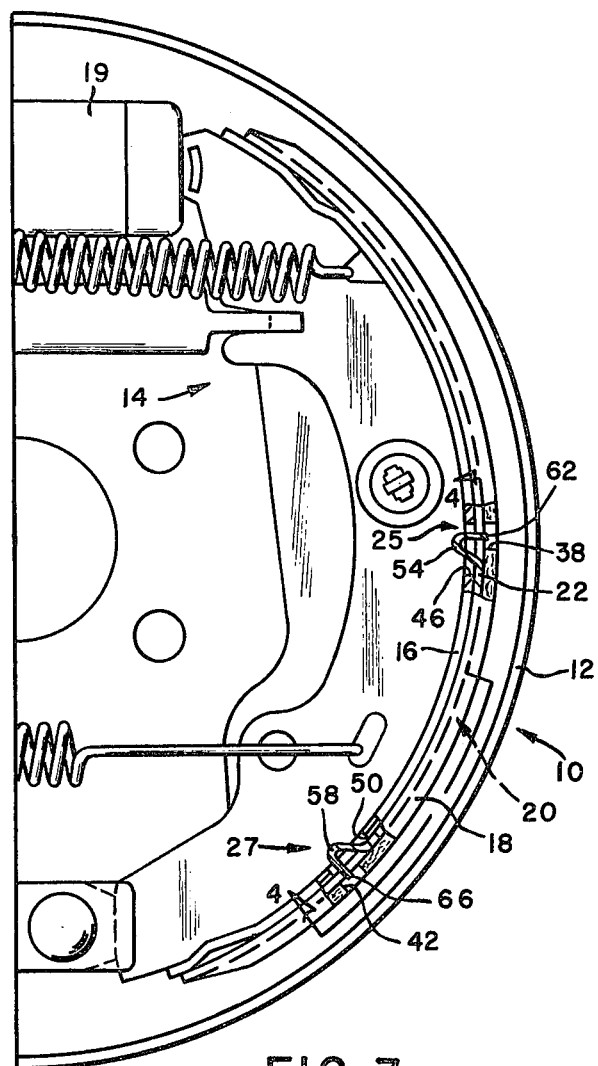
FIG. 3 is a sectional view of a brake showing an alternate embodiment of applicant's lining wear sensor.

An alternate embodiment of applicant's lining wear sensor is illustrated in FIGS. 3 and 4. In this alternate embodiment the friction lining 18 includes a plurality of bores such as 38, 42, and 44, and the brake shoe rim 16 includes a plurality of openings 46, 48, 50, and 52. Each projecting portions 25, 27, 29, and 31, includes a loop portion 54, 56, 58, and 60 which projects into and through corresponding rim openings 46, 48, 50, and 52. The ends 62, 64, 66, and 68 of each projecting portion extend from the rim openings into corresponding friction lining bores. Projecting portions 25 and 27 are formed out of sensor material on either side of a notch 70 cut in an end of sensor body portion 22. Projecting portions 29 and 31 are formed out of sensor material on either side of a notch 72 cut in the other end of sensor body portion 22.

With respect to both embodiments the sensor body portion 22 may be spot welded to the brake shoe rim 16 to insure the proper alignment of the sensor 20.

MODE OF OPERATION

The lining wear sensor 20 shown in FIGS. 1 and 2 is held in position against the surface of the brake shoe rim 16 in the groove 32 by the friction lining 18. The sensor projections 24 and 26 cooperate with the ends 34 and 36 of the friction lining 18 to retain the sensor body portion 22 within the groove 32.

The lining wear sensor 20 shown in FIGS. 3 and 4 is also held against the brake shoe rim 16 in the groove 32 by the friction lining 18. But, in this embodiment, the sensor projecting portions 25, 27, 29 and 31 cooperate with the walls of the rim openings 46, 48, 50, and 52, and of friction lining bores to retain the sensor body portion 22 within the groove 32.

In both embodiments during a braking application the brake drum engages the projecting portions 24 and 26 and 25, 27, 29, and 31 when the friction lining 18 has been worn a predetermined amount. A high frequency audible alarm signal is produced when the rotating brake drum 12 engages the sensor projecting portions. This signal is audible to the operator of the vehicle to make him or her aware that a brake lining is worn thin.

I claim:

1. In a drum brake assembly with a brake lining wear warning device having a backing plate, a pair of brake shoes carried by the backing plate, said brake shoes including friction pads carried by rim portions of said brake shoes, a hydraulic actuator to urge said friction pads into braking engagement with a brake drum, and at least one brake shoe including a lining wear sensor for producing an audible warning signal when the friction pad has been worn to a predetermined thickness, said sensor including a body portion with a plurality of projecting portions projecting therefrom, said projecting portions being engageable with said brake drum when said friction pad has been worn to a predetermined thickness to generate said warning signal, the improvement wherein:

said sensor body portion is disposed within a groove in said friction pad between said friction pad and said brake shoe rim, said groove extending from one end of said friction pad to an opposite end of said friction pad;

said groove, said friction pad and said brake shoe rim cooperating with said sensor body portion to retain said sensor in a position such that at least one of said projecting portions engages said brake drum when said friction pad has been worn to said predetermined thickness;

said sensor body portion extending between said ends of said friction pad, said projecting portions cooperating with said friction pad ends to retain said body portion within said groove; and said sensor body portion being retained in substantially parallel engagement with a surface of said brake shoe rim adjacent said friction pad, said projecting portions extending substantially perpendicularly away from said brake shoe rim.

2. In a brake system having a rotatable member, a friction pad engageable with the rotatable member upon a brake application, a mounting plate carrying the friction pad adjacent the rotatable member, and a lining wear sensor for producing an audible warning signal when the friction pad has been worn to a predetermined thickness, said sensor including a body portion with at least one projecting portion projecting therefrom, said projecting portion being engageable with the rotatable member to generate said warning signal upon wear of the friction pad to said predetermined thickness, the improvement wherein:

said sensor body portion is disposed within a groove between said friction pad and said mounting plate, said groove, said friction pad and said mounting plate cooperating with said body portion to retain said sensor in a position such that said projecting portion engages said rotatable member when said friction pad has been worn to said predetermined thickness, and said body portion extends from opposite ends of said friction pad and sensor projecting portions cooperate with said ends of said friction pad to retain said sensor body portion within said groove.

3. The lining wear sensor of claim 2 wherein:

said groove is formed in a surface of said friction pad adjacent said mounting plate, said groove extending between said friction pad ends.

* * * * *